H. P. CURTRIGHT.
RIDING ATTACHMENT FOR PLOWS, HARROWS, AND THE LIKE.
APPLICATION FILED JUNE 6, 1908.
926,548.
Patented June 29, 1909.
2 SHEETS—SHEET 2.
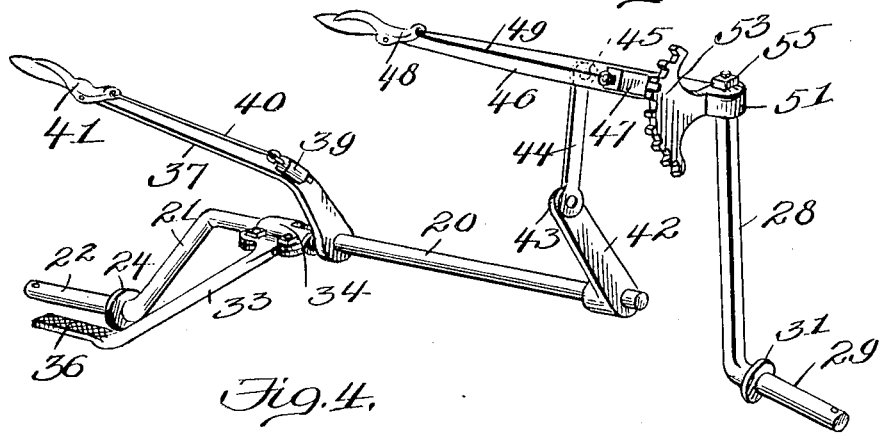
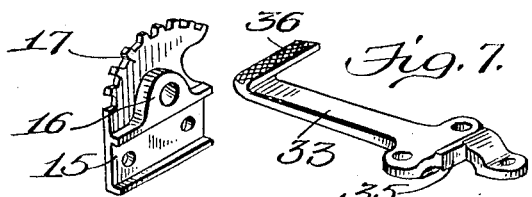
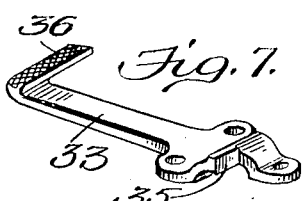
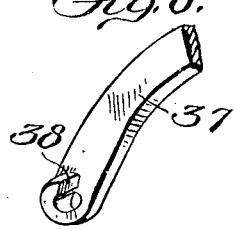
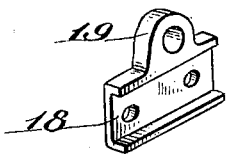
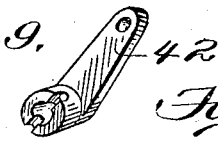
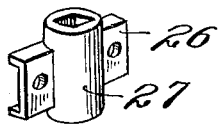
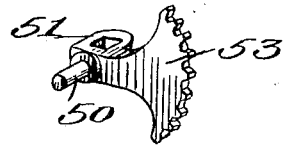
Witnesses:
Inventor
Harry P. Curtright
By James L. Norris
Atty.

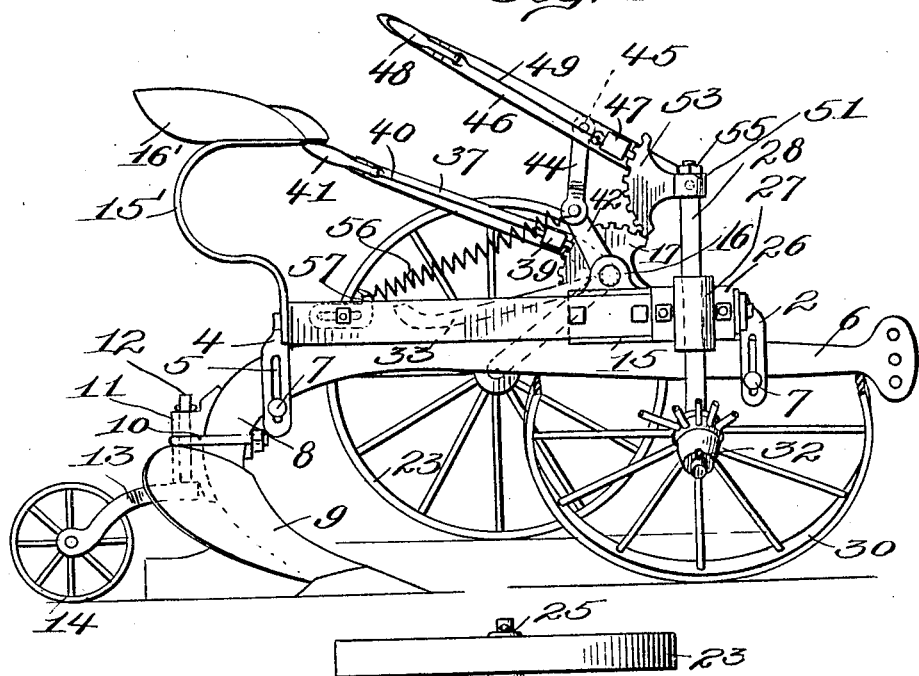

UNITED STATES PATENT OFFICE.

HARRY P. CURTRIGHT, OF HOLLIDAY, MISSOURI.

RIDING ATTACHMENT FOR PLOWS, HARROWS, AND THE LIKE.

No. 926,548.

Specification of Letters Patent.

Patented June 29, 1909.

Application filed June 6, 1908. Serial No. 437,161.

*To all whom it may concern:*

Be it known that I, HARRY P. CURTRIGHT, a citizen of the United States, residing at Holliday, in the county of Monroe and State of Missouri, have invented new and useful Improvements in Riding Attachments for Plows, Harrows, and the Like, of which the following is a specification.

This invention relates to riding attachments for plows, harrows and for other purposes wherein it is found applicable and is devised primarily as an improvement upon the riding attachment disclosed in Letters Patent No. 879,047 of date of February 11, 1908, and the objects thereof are to provide a riding attachment in the manner as hereinafter set forth which can be conveniently adjusted by the foot or the hand, comparatively simple in its construction, strong, durable, efficient in its use, readily set up and inexpensive to manufacture.

With the foregoing and other objects in view, the invention consists of the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In the drawings:—Figure 1 is a side elevation of a plow showing the adaptation therewith of a riding attachment in accordance with this invention. Fig. 2 is a top plan view. Fig. 3 is a diagrammatic perspective view of the mechanism for relatively adjusting the wheels and frame, and Figs. 4 to 11 are details in perspective of elements of the adjusting mechanism.

Referring to the drawings in detail, 1 denotes a rectangular frame having the forward end provided with a hanger 2 formed with an elongated vertically extending slot and the rear end of the frame is also provided with a hanger 4 having a vertically extending elongated slot 5. Each of the hangers 2, 4 is formed of two sections, as shown in Fig. 2, and between the sections of each hanger extends the plow beam 6. Bolts 7 which extend through the sections of each hanger support the plow beam, as clearly shown in Fig. 1. The beam 6 terminates at its rear in a standard 8 to which the plow share 9 is attached. Clamped to the plow standard 8 through the medium of the yoke 10 is a bearing 11 through which extends a vertically arranged shaft 12 having a bracket 13 connected to its lower end, the bracket 13 carrying the rear furrow wheel or runner 14. Attached to the rear of the frame 1 is a support 15' for the seat 16'.

Connected to one of the side bars of the frame 1 through the medium of suitable holdfast devices is a channeled supporting bracket 15 provided with a bearing 16 and further having a forwardly extending toothed quadrant 17. Secured to the other side bar of the frame 1 through the medium of suitable hold-fast devices is a channeled supporting bracket 18 having an upwardly extending bearing 19 and a second quadrant 17. The bracket 18 is positioned directly opposite the bracket 15 and journaled in the bearings 16 and 19 is a transversely extending axle 20 which owing to the position of the bearings 16 and 19 is arranged above the top of the frame 1. One end of the axle 20 terminates in an angularly extending depending portion 21 which terminates in a spindle 22 for the reception of what may be termed the land side wheel 23. A collar 24 is provided upon the spindle 22 to arrest the inward movement of the wheel 23 and a cotter pin 25 is carried by the spindle 22 to maintain the wheel 23 in position. The axle 20 terminates in the bearing 16 and does not project laterally from that side of the frame upon which the bracket 15 is secured.

Mounted upon that side of the frame 1 to which the bracket 18 is secured is a supporting bracket 26, the latter being secured in position by suitable hold-fast devices and is formed with a vertically extending bearing 27 through which extends a slide or standard 28 terminating at its lower end in a spindle 29 which is canted so that the spindle will depend downwardly at an inclination with respect to the rod 28. Upon the spindle 29 is mounted what may be termed the furrow wheel 30, the inward movement of said wheel being arrested by the collar 31 carried by the spindle 29 and the said wheel 30 is maintained upon the spindle 29 by the cotter pin 32. By canting the spindle 29, the wheel 30 extends at an inclination with respect to the frame 1 and also with respect to the land side wheel 23.

The mechanism for relatively adjusting the wheels and frame is so constructed and set up with respect to the axle 20 and rod 28 as to enable a relative adjustment between the frame and both wheels simultaneously or a relative adjustment of the frame and the wheel 30 independently of the shifting of the wheel 23. Various elements of the adjusting mechanism are clearly shown in Figs. 3 to 11 and referring to the said figures 33 denotes a foot lever which is clamped as at 34 to that portion of the axle 20 which projects from that side bar of the frame 1 upon which is mounted the bracket 18. The clamping means 34 for the foot lever 33 is formed with a shoulder 35, the function of which will be hereinafter referred to and the said lever 33 is formed with a foot tread 36 at its free end.

Loosely mounted upon the axle 20 at the side of the clamping means 34 is an upwardly extending hand lever 37 provided with a protuberance 38 adapted to be engaged by the shoulder 35 whereby when the said hand lever 37 is fixed in position, the upward movement of the foot lever 33 will be arrested. The hand lever 37 is fixed from movement through the medium of a spring pressed dog 39 adapted to engage in the teeth of the adjacent segment 17 secured to the frame, the dog 39 being actuated through the medium of a connecting rod 40 and a bell crank 41, the rod 40 and bell crank 41 being connected with the dog 39. When the dog 39 is out of engagement with the toothed segment 17, the lever 37 can be shifted downwardly and owing to the engagement of the protuberance 38 with the shoulder 35, the foot lever 33 and axle 20 will be shifted, the lever 33 lowering, as will be evident. The protuberance 38 of the hand lever 37 does not interfere with the operation of the foot lever 33 when it is desired to lower the same, that is to say, the foot lever 33 can be actuated independently of the lever 37. After the foot lever 33 has been actuated independently of the lever 37 and it is desired to maintain the lever 33 in its adjusted position, the hand lever 37 is shifted until the protuberance 38 engages the shoulder 35; then the lever 37 is locked by the movement of the dog 39 into engagement with one of the teeth of the segment 17. This operation prevents the elevating of the lever 33. Secured to the axle 20 in proximity to the inner face of the supporting bracket 15 is a crank 42 having the lower end 43 of a link 44 pivotally connected therewith.

The link 44 and lever 46 form a toggle connection between the land and furrow wheels which serve to lock the plow-carrying frame in lowered position thereby holding the plow in the ground. A lifting spring 56 is attached at one end to the frame by means of an adjustable bracket 57 and at its opposite end it is attached to the crank 42, this spring serving to assist in lifting the frame after the toggle connection has been unlocked. The upper end of the link 44 is pivotally connected as at 45 to a hand lever 46. The latter carries a spring pressed dog 47 which latter is connected to a bell crank 48 through the medium of a rod 49. The forward end of the lever 46 is pivotally mounted upon a protuberance 50 extending laterally from a hub 51 which is mounted upon the squared portion 52 formed on the upper end of the rod 28. Formed integral with the hub 51 is a rearwardly extending toothed segment 53 adapted to be engaged by the pawl 47. The terminus of the rod 28 is screw-threaded as at 54 and upon which is mounted a nut 55 for maintaining the hub 51 upon the rod 28. By setting up the elements 42, 44, 46 and 53 in the manner as stated and engaging the dog 49 with the toothed segment 53, both wheels will be simultaneously adjusted when the lever 33 is shifted downwardly. If the dog 49 is moved out of engagement with the toothed segment 53, the wheel 30 can be elevated or lowered as desired independently of the shifting of the wheel 23. In this connection it will be stated that after the plowing has been completed and it is desired to shift or adjust the wheel 30 so that the tread thereof will be in alinement with the tread of the wheel 23, the dog 47 is moved out of engagement with the segment 53, the lever 46 depressed, and the pivot of the lever is then at 45. When the wheel 30 has been adjusted to the position desired, the dog 49 is moved into engagement with the toothed segment 53 and the parts are then locked. Both wheels are allowed to move upwardly relatively to the frame when the lever 37 is released from the segment 17. By lowering the foot lever 33 or shifting the lever 57 toward the operator, the plow can be raised out of the ground. This operation can be had by the foot lever alone or by the hand lever 57 in connection with the shoulder upon the clamp 34 of the foot lever. When the foot lever 33 is operated to elevate the plow the hand lever 57 remains stationary. The lever 46 provides means by which the depth of the plow is regulated. By setting up the rear furrow wheel or runner in the manner stated, it will allow the plow to be turned either to the right or left without the wheel 14 dragging.

What I claim is:—

1. In a sulky plow, the combination of a frame, a shaft rotatable thereon and having a pair of cranks, a wheel mounted on one of said cranks, a slide movable vertically with respect to said frame, a second wheel mounted on said slide, an adjustable operative connection between said slide and the other crank of said shaft whereby the elevation of either side of the frame may be varied, and means coöperative with said shaft for effecting a simultaneous relative adjustment between the frame and both of said wheels.

2. In a sulky plow, the combination of a frame, a shaft rotatable thereon and having inner and outer cranks, a wheel mounted on the outer crank, a standard movable vertically with respect to said frame, a second wheel mounted on said standard, a lever pivoted relatively to said standard and operatively connected to the inner crank on said shaft, means for locking said lever in different adjusted positions relatively to the standard, and means coöperative with said shaft for adjusting the frame relatively to the wheels.

3. In a sulky plow, the combination of a frame, a transverse shaft rotatable thereon and having inner and outer cranks, a wheel mounted on one of said cranks, a standard slidable vertically relatively to said frame, a second wheel carried by said standard, a lever pivoted on said standard, a notched segment fixed to the standard, an operative connection between the inner crank on said shaft and said lever, means for locking said lever to said segment, and means coöperative with said shaft for turning it to adjust the frame relatively to said wheels.

4. In a sulky plow, the combination of a frame, a transverse shaft rotatable thereon and having inner and outer cranks, a land side wheel mounted on the outer crank, a standard arranged at the opposite side of said frame and slidable vertically with respect thereto, a furrow wheel carried by said standard, an adjustable operative connection between said standard and the inner crank of said shaft, a spring coöperative with the said inner crank of said shaft and having a tendency to lift the frame, and means coöperative with said shaft for effecting relative adjustments between the frame and wheels.

5. In a sulky plow, the combination of a frame, a transverse shaft rotatable thereon and provided with a crank, a wheel mounted on said crank, a foot lever rigidly fixed to said shaft, a hand lever loosely mounted on said shaft, means for locking the hand lever in different adjusted positions relatively to the frame, and coöperative means arranged on the foot and hand levers respectively for causing depression of the foot lever by the hand lever and permitting movement of the foot lever independently of the hand lever.

6. In a sulky plow, the combination of a frame, a transverse shaft rotatable thereon and provided with a crank, a wheel mounted on said crank, a foot lever fixed to said shaft and provided with a lateral projection, a hand lever loosely mounted on the shaft and provided with a lateral projection arranged to coöperate with the projection on the foot lever when the hand lever is turned in a direction to elevate the frame, a notched segment fixed to the frame, and means coöperative with said segment and hand lever for locking the latter in different angular positions.

In testimony whereof I have hereunto set my hand in presence of two subscribing witnesses.

HARRY P. CURTRIGHT.

Witnesses:
DAN HILL,
W. C. CUNNINGHAM.